United States Patent
Crockett et al.

(10) Patent No.: US 6,587,933 B2
(45) Date of Patent: Jul. 1, 2003

(54) METHOD, SYSTEM, AND PROGRAM FOR DISCARDING DATA IN A STORAGE SYSTEM WHERE UPDATES TO A PRIMARY STORAGE DEVICE ARE SHADOWED IN A SECONDARY STORAGE DEVICE

(75) Inventors: Robert Nelson Crockett, Tucson, AZ (US); William Frank Micka, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 09/770,895

(22) Filed: Jan. 26, 2001

(65) Prior Publication Data

US 2002/0103980 A1 Aug. 1, 2002

(51) Int. Cl.$^7$ .............................................. G06F 12/00
(52) U.S. Cl. ...................... 711/154; 711/113; 711/122; 711/162; 711/202; 711/203; 711/3; 711/207; 709/100; 710/3
(58) Field of Search ................................ 711/113, 122, 711/162, 202, 203, 3, 154, 207; 703/100; 710/3

(56) References Cited

U.S. PATENT DOCUMENTS

| | | | |
|---|---|---|---|
| 5,551,003 A | 8/1996 | Mattson et al. | 711/136 |
| 5,555,371 A | 9/1996 | Duyanovich et al. | 714/13 |
| 6,052,799 A | 4/2000 | Li et al. | 714/13 |
| 6,088,765 A * | 7/2000 | Ohtsuka | 711/113 |
| 6,253,295 B1 * | 6/2001 | Beal et al. | 711/162 |
| 6,286,089 B1 * | 8/2001 | Greiner et al. | 711/203 |

OTHER PUBLICATIONS

A. Pate, et al., "RAMAC Virtual Array: Implementing Peer–to Peer Remote Copy", IBM International Technical Support Organization, SG24–5338–00, Dec. 1998.
"RAMAC Virtual Array Introduction", IBM Corporation, IBM BookManager Print Preview, Jun. 1999, Chap. 7.2.

* cited by examiner

Primary Examiner—Do Hyun Yoo
Assistant Examiner—Mehdi Namazi
(74) Attorney, Agent, or Firm—David W. Victor; Konrad Raynes Victor & Mann LLP

(57) ABSTRACT

Provided is a method, system, and program for releasing storage space in a first and second storage devices. Updates to the first storage device are copied to the second storage device to provide secondary storage for the updates. A first and second tables map data sets to addresses in the first and second storage devices, respectively. A first command is detected to invalidate data sets in the first table. The addresses in the first table comprise virtual addresses, and a third table provides a mapping of the virtual addresses to physical storage locations in the first storage device. A second command is generated to update the second table to invalidate the data sets in the second storage device invalidated in the first table by the first command. A third command is detected to invalidate the virtual addresses in the third table used by the data sets invalidated in the first table to free the physical storage locations in the first storage device pointed to by the invalidated virtual addresses. A fourth command is generated that is directed to the physical storage locations in the second storage device used by the invalidated data sets.

34 Claims, 4 Drawing Sheets

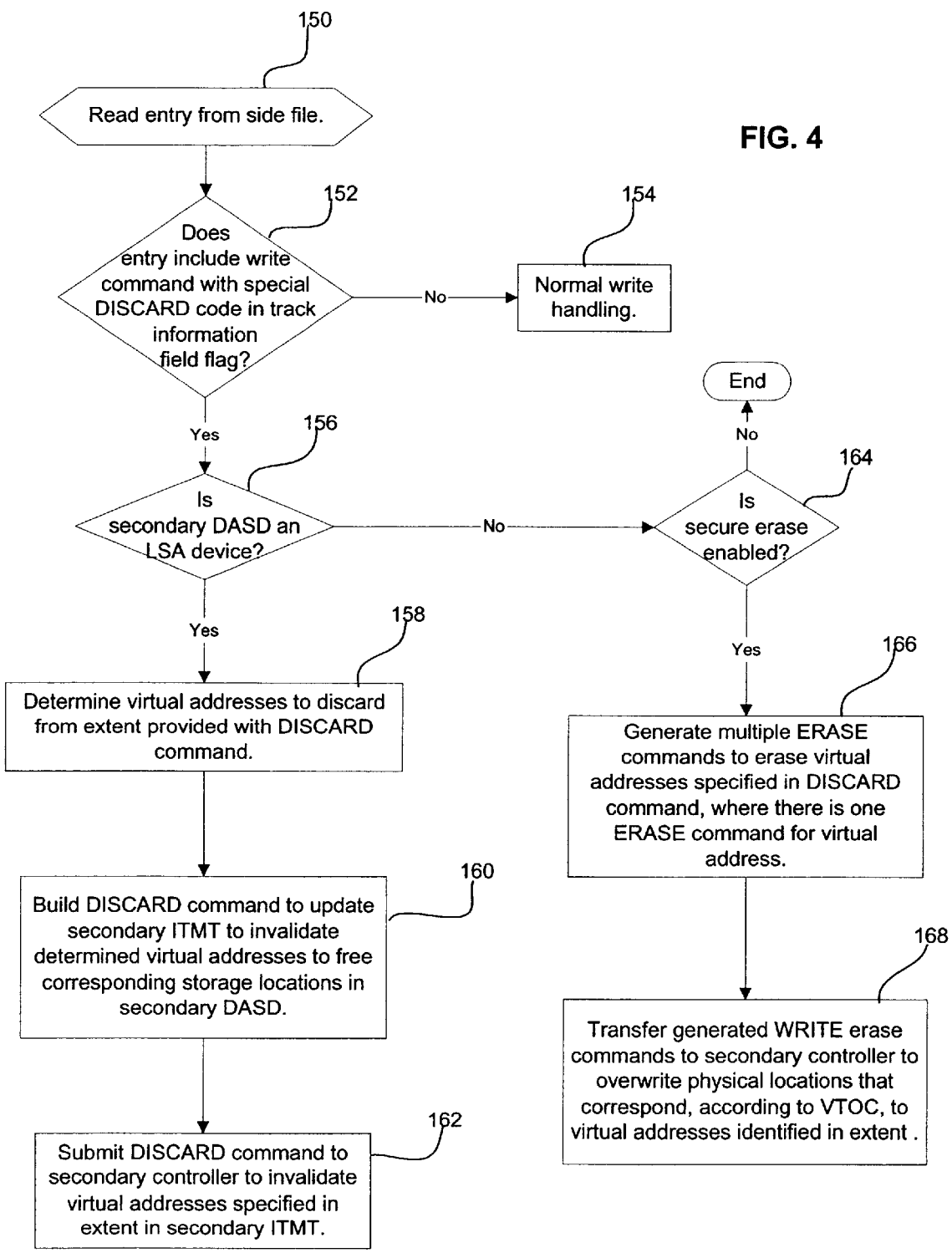

METHOD, SYSTEM, AND PROGRAM FOR DISCARDING DATA IN A STORAGE SYSTEM WHERE UPDATES TO A PRIMARY STORAGE DEVICE ARE SHADOWED IN A SECONDARY STORAGE DEVICE

BACKGROUND OF THE INVENTION

1. Field of the Invention

The present invention relates to a system, method, and program for releasing storage space in a storage system where updates to a primary storage device are shadowed in a secondary storage device.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM of XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

Data in the primary and secondary volumes in the IBM XRC systems may be stored in a Log Structured Array (LSA) format in which mappings provide virtual locations of the data sets. A table referred to as a Volume Table of Contents (VTOC) that provides an index mapping data sets (e.g., files, records, etc.) to logical addresses or locations on the DASD. An LSA volume further includes an Internal Track Mapping Table (ITMT) that maps the virtual addresses to disk array storage locations where the data is stored. When data is written to the system, it is compressed and compacted, assembled into fixed blocks, and written to the DASD. All write operations in virtual disk architecture are always directed to a new place in the disk array. In this way, even if data is written to the same virtual location, on disk, the data is written to a new free storage location and the virtual location is updated to point to the new location where the data is written. Non-LSA systems include a VTOC that maps the volume data sets or files to physical locations, e.g., cylinder-head-record (CCHR), in the DASD, but do not include an ITMT as the data sets map directly to physical locations.

In prior art XRC systems, write operations to the primary volume are transferred to the secondary controller to write to the secondary volume in the same sequence that the writes are applied to the primary volume to ensure write sequence integrity. In both LSA and non-LSA volumes, when a data set is deleted by a host system, the VTOC entry for that data set is updated to indicate that the space is no longer in use. In IBM LSA storage systems, a deleted data space release (DDSR) program runs on the primary LSA volume to determine all virtual addresses invalidated in the VTOC. The DDSR program would then call the DISCARD command to update the ITMT for the primary volume to nullify the pointers from the virtual addresses nullified in the VTOC to physical locations in the primary DASD.

The DISCARD command specifies a range of nullified virtual addresses determined from the VTOC to invalidate in the ITMT. The DISCARD command frees the physical storage space addressed by those nullified virtual addresses to make available for future allocations to virtual addresses. Any future attempt to access the deleted virtual address would result in a return of a null pointer, as the virtual address was invalidated. The DDSR program may run periodically on LSA volumes to free the storage locations addressed by invalidated pointers or after the VTOC is updated. Non-LSA systems do not need a DDSR program or DISCARD command as such volumes do not utilize the ITMT table to maintain a virtual to physical mapping.

In prior art XRC systems where the secondary volume is an LSA system, the DDSR operation is not performed on the secondary LSA volume to update the secondary ITMT in order to preserve write sequence integrity concerns. For instance, if the DDSR operation processes the secondary VTOC to determine ITMT entries to invalidate after data is written to the secondary DASD and before the secondary VTOC is updated, then the DDSR operation would not recognize that the data written to the secondary DASD not yet reflected in the secondary VTOC is a valid data set as there is no pointer in the VTOC to the just updated storage location in the secondary DASD. In such case, the DDSR operation may issue a DISCARD command to free the storage locations in the secondary DASD indicated in the secondary ITMT just updated. When the secondary VTOC is subsequently updated to provide pointers from the updated data sets to virtual addresses, the virtual addresses in the secondary ITMT would no longer point to the updated data in physical storage, which was erased by the intervening DDSR operation. In such case, the new updates on the secondary DASD may be erased, thereby eliminating the shadow copy of the updates.

Due to the above data integrity concern, in prior art remote copy systems, data remains on the secondary LSA volume even when the virtual addresses in the secondary VTOC are invalidated to avoid invalidating the secondary ITMT mapping of virtual addresses to the physical storage locations of the new updates not yet reflected in the VTOC. Thus, in the prior art, the DDSR operation is not performed on secondary volumes in XRC systems. Because the secondary storage locations are not freed, the primary LSA volume has more available space then the secondary LSA volume as the storage locations including the discarded data at the primary volume are freed while the storage locations at the secondary LSA volume are not freed. Due to this situation, the secondary DASD may run out of storage space before the primary DASD.

Moreover, in the prior art, if the secondary volume is a non-LSA volume, then the DISCARD operation performed on the LSA primary volume cannot be transferred to the secondary non-LSA volume as there is no secondary ITMT to which the DISCARD command would apply. In the prior art, the data discarded at the primary volume remains on the secondary non-LSA volume. This process poses a security concern as data that was discarded at the primary volume remains available and accessible on the secondary volume.

For these reasons, there is a need in the art for improved techniques for managing data clean-up operations in a system where a secondary volume is used to shadow updates to a primary volume.

SUMMARY OF THE PREFERRED EMBODIMENTS

Provided is a method, system, and program for releasing storage space in a first and second storage devices. Updates to the first storage device are copied to the second storage device to provide secondary storage for the updates. A first and second tables map data sets to addresses in the first and second storage devices, respectively. A first command is detected to invalidate data sets in the first table. The addresses in the first table comprise virtual addresses, and a third table provides a mapping of the virtual addresses to physical storage locations in the first storage device. A second command is generated to update the second table to invalidate the data sets in the second storage device invalidated in the first table by the first command. A third command is detected to invalidate the virtual addresses in the third table used by the data sets invalidated in the first table to free the physical storage locations in the first storage device pointed to by the invalidated virtual addresses. A fourth command is generated that is directed to the physical storage locations in the second storage device used by the invalidated data sets.

In further embodiments, the addresses in the second table comprise virtual addresses, and a fourth table provides a mapping of the virtual addresses to physical storage locations in the second storage device. In such case, the fourth command updates the fourth table by invalidating the virtual addresses in the fourth table used by the data sets invalidated in the second table by the second command to free the physical storage locations in the second storage device pointed to by the invalidated virtual addresses.

In still further embodiments, the second table maps data sets to physical storage locations in the second storage device. In such case, generating the fourth command comprises generating at least one erase command to overwrite the physical storage locations in the second storage device that store the invalidated data sets.

Certain of the described implementations provide a technique for discarding data at the secondary storage device when a discard operation is performed with respect to virtual addresses at the primary storage device that point to physical storage locations in a manner that ensures data integrity. In this way, space is freed at the second storage device when the discard operation is performed on the primary storage device. In additional implementations, if the secondary storage device does not provide for virtual addressing, then erase commands may be generated in response to a discard operation at the primary storage device to overwrite the corresponding addresses in the secondary storage device.

BRIEF DESCRIPTION OF THE DRAWINGS

Referring now to the drawings in which like reference numbers represent corresponding parts throughout:

FIGS. 3 and 4 illustrate logic to generate commands to implement discard operations applied to the primary storage device against the second storage device in accordance with preferred embodiments;

DETAILED DESCRIPTION OF THE PREFERRED EMBODIMENTS

In the following description, reference is made to the accompanying drawings which form a part hereof and which illustrate several embodiments of the present. invention. It is understood that other embodiments may be utilized and structural and operational changes may be made without departing from the scope of the present invention.

Figure 1:
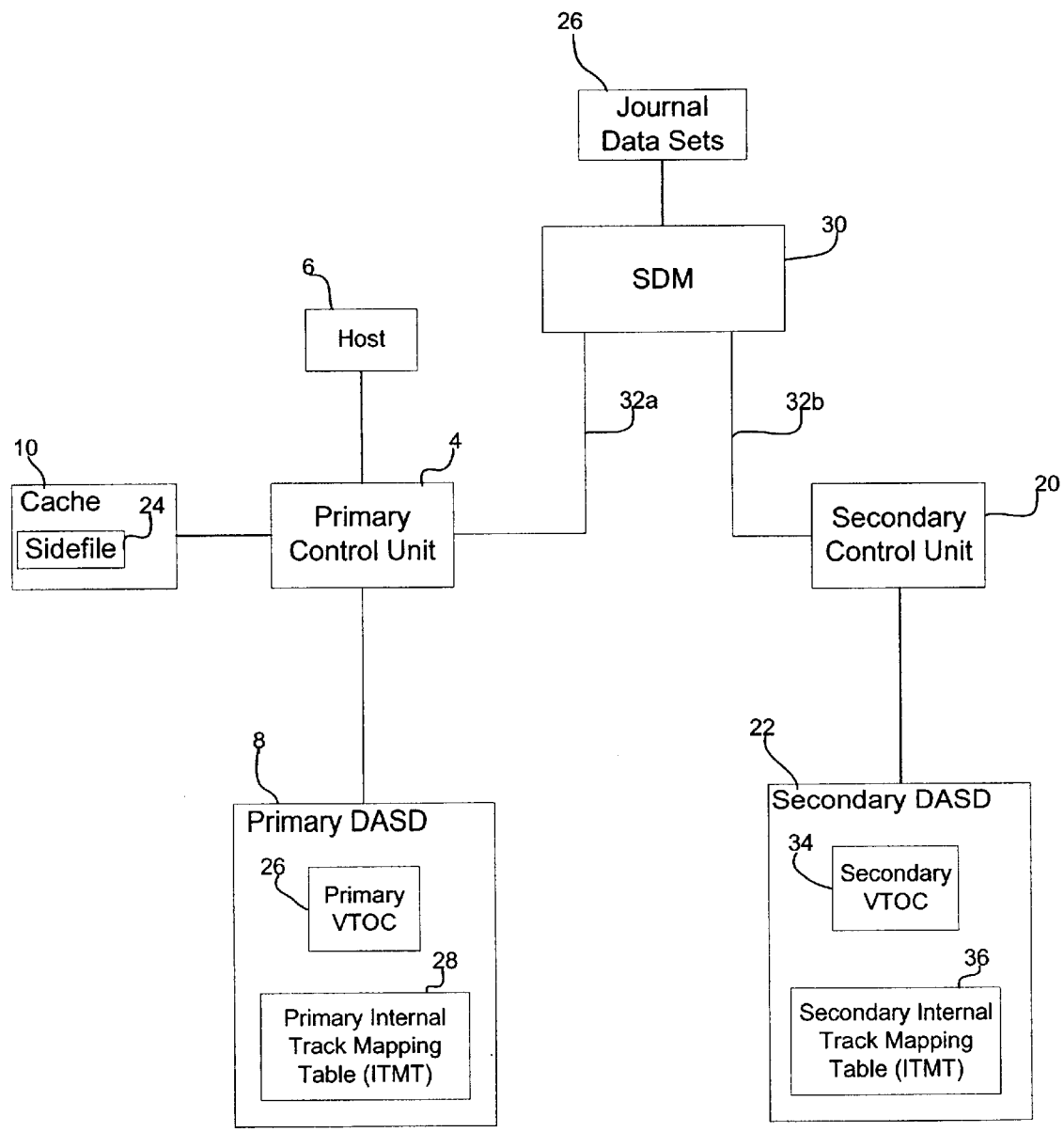
FIG. 1 is a block diagram illustrating an arrangement of primary and secondary storage devices in which preferred embodiments are implemented.

FIG. 1 illustrates a computing environment in which preferred embodiments are implemented. A primary control unit 4 provides one or more host 6 computers access to a primary DASD 8. The primary control unit 4 has a primary cache 10 in which updates to tracks in the DASD 8 are maintained until destaged to DASD 8. Back-up copies of all or a subset of the volumes of the DASD 8 may be maintained at a secondary DASD 22. A "volume pair" comprises a volume in the primary DASD 8 and the shadow of that volume in the secondary DASD 22 that maintains a back-up copy of the data at the primary volume in the volume pair. Thus, for each primary volume, there is a corresponding secondary volume with identical contents; this is a volume pair. Updates to the primary DASD 8 are transferred to the secondary control unit 20 for storage in the secondary DASD 8 to assure that the secondary DASD 22 maintains a consistent and concurrent image of the primary DASD 8. The primary control unit 4 may further include a non-volatile storage unit (not shown), such as a battery-backed up volatile memory, to maintain a non-volatile copy of data updates. The control units 4 and 20 may be comprised of the IBM 3990, Model 6 Storage Controller, or any other control unit known in the art.

Preferred embodiments include a system data mover (SDM) program 30, such as the SDM program included in the IBM XRC system, that is in communication with the primary 4 and secondary 20 control units, and manages the transfer of updates to the secondary DASD 22. Thus, data is transferred between the primary 4 and secondary 20 control units via the SDM 30. In preferred embodiments, the SDM 30 and the control units 4 and 20 communicate via communication paths 32a, b, which are preferably direct high speed transmission lines, such as an Enterprise System Connection (ESCON) link. (ESCON is a registered trademark of IBM). However, the communication paths 32a, b may be comprised of any other communication means known in the art, including network transmission lines, etc. The SDM software may be maintained at the site of the primary control unit 4, the secondary control unit 20 or an independent site.

The primary control unit 4 initially writes data updates to a sidefile 24 in a cache 10 for the primary control unit 4. The system data mover (SDM) 30 takes the data updates from the sidefile 24 and writes them to journal data sets 26. Within the journal data sets, the updates are arranged into consistency groups. Consistency groups are formed for all updates to volumes that share a session. The consistency group contains records that have their order of update preserved, even across multiple storage controls. This preservation of order is vital for applications that process dependent write I/Os such as index and data and database and log. Further details of the arrangement of the system data mover, journal data sets, primary and secondary control units, and DASDs are described in the IBM publication "Planning for IBM Remote Copy," IBM document No. SG24-2595-00 (Copyright IBM Corp., 1995), which publication is incorporated herein by reference in its entirety.

The primary control unit 4 maintains a primary VTOC 26 that includes pointers from data sets to virtual addresses in the primary DASD 8. The primary control unit 4 also maintains a primary internal track mapping table (ITMT) 28 that provides a mapping of virtual addresses to physical storage, thereby indicating which physical storage locations in the primary DASD 8 are free or allocated. The secondary control unit 20 maintains a secondary VTOC 34. In LSA implementations, the secondary control unit 20 also maintains a secondary ITMT 36 that indicates whether each storage location in the secondary DASD 8 is free or allocated. In implementations where the secondary DASD 22 is not an LSA device, there is no secondary ITMT 36 because the secondary VTOC directly maps data sets to physical storage locations.

Figure 2:
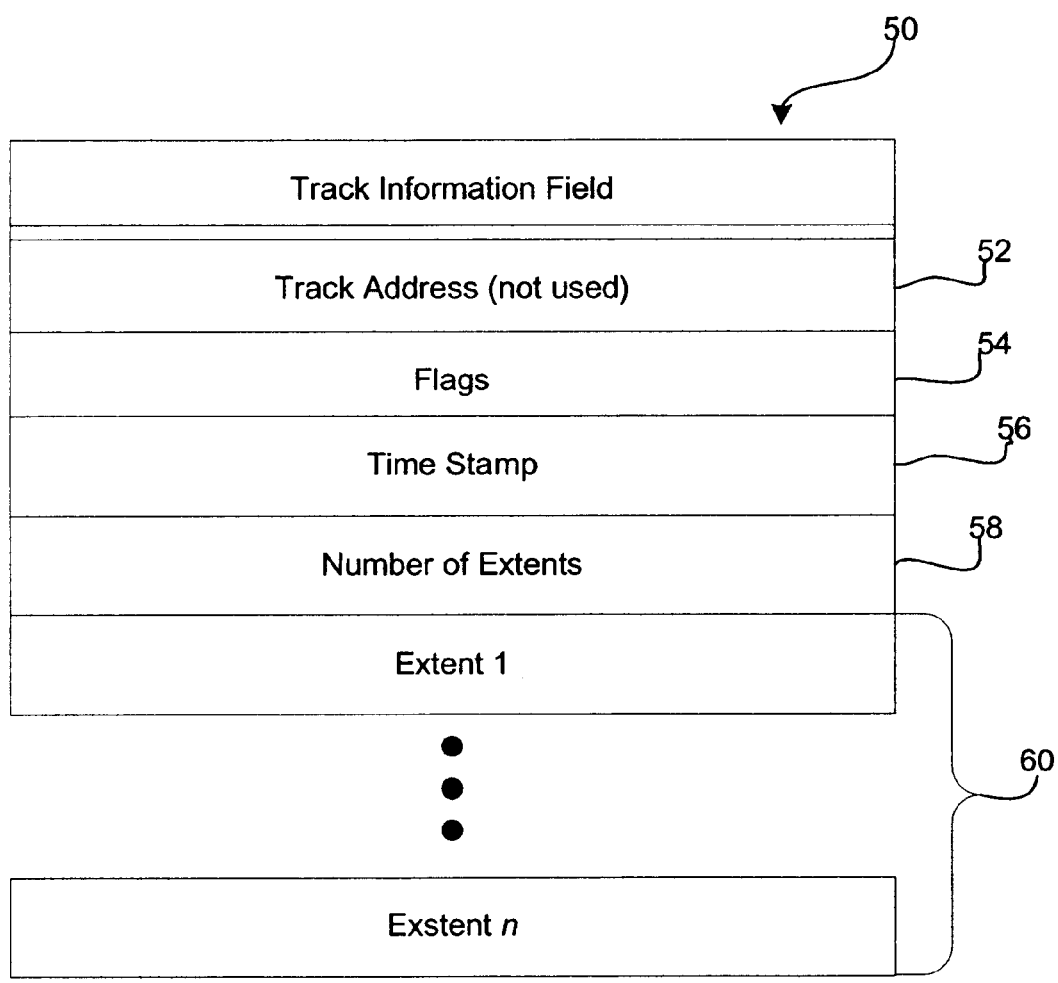
FIG. 2 illustrates a format of a track information field in accordance with the preferred embodiments.

In the IBM CKD system, a DISCARD command is indicated by specifying a special code with a Perform Subsystem Function command indicating to discard an extent of tracks associated with the Perform Subsystem Function command specifying a DISCARD code. FIG. 2 illustrates a possible implementation for the format of a track information field 50 provided with a DISCARD command. The fields for the track address 52, flags 54, and time stamp 56 are also used in the track information field of a standard write command. The track information field 50 for the described DISCARD command differs from a write command in that the track address field 52 is not used and the flag field 54 would provide a code indicating that the track information field is used with the DISCARD command. Further, with a standard write command there would be one data field for the data set(s) to write. However, with the track information field 50 for the DISCARD command, the field for the data sets are replaced with a number of extents field 58 indicating the number of extents or ranges of addresses to DISCARD followed by the extents 1 through n 60 providing the ranges or extents of addresses to DISCARD. Upon detecting a DISCARD operation in the sidefile 24, the system data mover (SDM) 30 creates a write command that includes the track information field format 50 shown in FIG. 2 to specify the DISCARD operation for the same range of extents.

Figure 3:
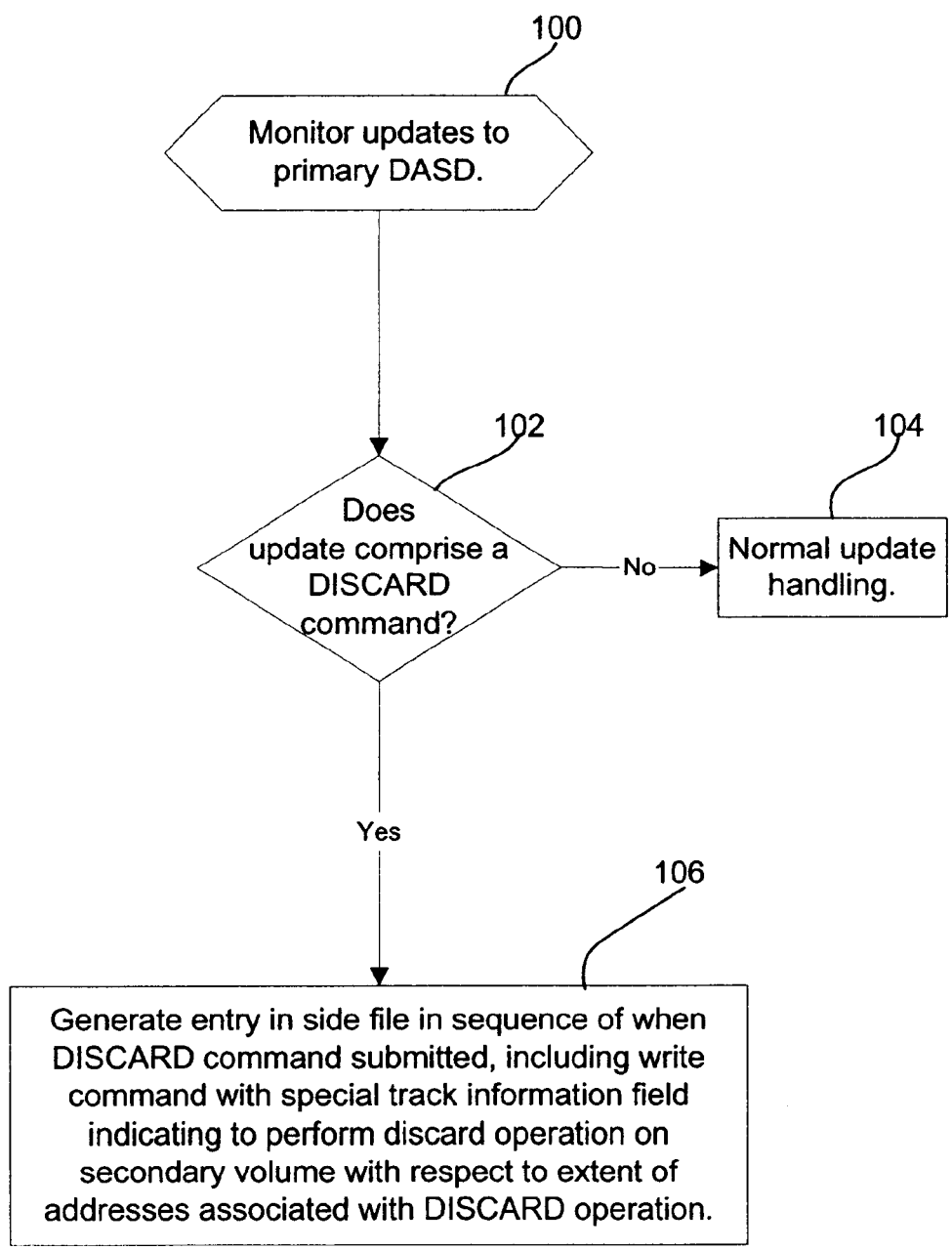

FIGS. 3 and 4 illustrate logic implemented in code executed by the primary control unit 4 to free space in the secondary control unit 20 that shadowed data discarded from the primary control unit 4. The primary control unit 4 monitors (at block 100) updates to the primary DASD 8. If (at block 102) an update is a DISCARD operation, which would accompany an update to the primary VTOC 26 to invalidate those virtual addresses also specified with the DISCARD command, then the primary control unit 4 builds (at block 106) an entry in the side file 24 of the cache 24 in the sequence in which the DISCARD command was submitted with respect to other updates to the primary DASD 8. This entry includes a write command with a special track information field 50 (FIG. 2) specifying an extent of addresses to invalidate. This write command with the special track information field 50 instructs the system data mover (SDM) 30 to submit a DISCARD command to the secondary control unit 20 to free the space in the secondary DASD 22 corresponding to the virtual addresses specified within the extent of addresses provided with the DISCARD command.

If (at block 102) the update is not a DISCARD operation, then the primary control unit 4 handles (at block 104) the update in a manner known in the art.

FIG. 4 illustrates logic executed by the system data mover (SDM) 30 to read entries from the side file 24 in accordance with preferred embodiments. At block 150, the system data mover (SDM) 30 reads an entry from the side file 24. If (at block 152) the entry accessed from the sidefile 24 does not include the write command with the flag 54 including a code value indicating a DISCARD operation, then the entry is handled (at block 154) in a manner known in the art. Otherwise, if the entry is a write command with the flag 54 including the DISCARD code, then the system data mover (SDM) 30 determines (at block 156) whether the secondary DASD 22 is an LSA device. If the secondary DASD 22 is an LSA device, then the system data mover (SDM) 30 determines (at block 158) from the extents 60 in the track information field 50 the virtual addresses to subject to the DISCARD operation. The system data mover (SDM) 30 then generates (at block 160) a DISCARD command including the track information field 50 to perform the DISCARD operation with respect to the determined extents, by inserting the determined extents into the field of extents 60. This generated DISCARD command would instruct the secondary controller 20 to update the secondary ITMT 36 to invalidate the determined virtual addresses indicated in the field of extents 60 to free the physical space in the secondary DASD 22 corresponding to the invalidated virtual addresses. The system data mover (SDM) 30 then submits (at block 162) the DISCARD command to the secondary controller 20 to execute. In preferred embodiments, the system data mover (SDM) 30 sends the DISCARD command at block 162 to the secondary control unit 20 to apply to the secondary DASD 22 in the same sequence as the DISCARD operation was applied to the primary DASD 8 and entered in the sidefile 24, which can be determined from the time stamp filed of the entry in the sidefile 24. Applying the DISCARD command to the secondary DASD 22 in the sequence in which the DISCARD operation is applied to the primary DASD 8 ensures data integrity.

If (at block 156), the secondary DASD 22 is not an LSA device, then the system data mover (SDM) 30 determines (at block 164) whether secure erase is enabled In preferred embodiments, when the XRC session is established, the user may invoke a command to enable secure erase to perform a secure erase on the secondary non-LSA DASD 22. If secure erase is enabled, then the system data mover (SDM) 30 generates (at block 166) multiple ERASE commands to cause the secondary controller 20 to erase each record included in the extent of records provided with the DISCARD command, such that there is one ERASE command for each record set. The ERASE commands overwrites the contents of the specified record set with a single value, e.g., all ones or zeroes. This ERASE command causes the secondary controller 20 to erase the physical storage space in the secondary DASD 22 corresponding to the data sets specified in the ERASE command. Because the secondary DASD 22 is non-LSA, the secondary VTOC for such non-LSA device provides a mapping of the data sets to physical storage locations in the secondary DASD 22. The system data mover (SDM) 30 transfers (at block 168) the ERASE commands, which may comprise a write command with a special code, to the secondary control unit 20 to overwrite the specified data sets. Additionally, the secondary VTOC may be updated in sequence with the ERASE command to invalidate those data sets in the secondary VTOC subject to the ERASE command to eliminate all reference to the erased data sets as well as the actual data in the physical storage space.

Enabling the erase option for non-LSA secondary DASDs ensures security by overwriting in the secondary DASD 22 the contents of data discarded on the LSA primary DASD 8. However, erasing the data records in the secondary DASD 22 takes substantially more time and I/O operations than discarding the same data sets on the primary DASD 8. For instance, discarding an extent of data sets on the primary LSA DASD 8 requires only one I/O operation to invalidate the virtual addresses specified in the primary VTOC 26. On the other hand, one write operation is needed to overwrite the contents of each specified data set on the non-LSA secondary DASD 22, thereby requiring numerous I/Os to erase or overwrite the extent of discarded data sets on the secondary DASD 22. The additional I/Os required to perform the erase on the secondary DASD 22 may adversely affect system performance as erasing the secondary DASD 22 may take significantly more time than the discard operation performed on the primary DASD 8. For this reason, preferred embodiments allow the user to specify whether to enable the erase on the secondary DASD 22 in order to allow the user to select the tradeoff between system performance and security to ensure that data discarded at the primary DASD 8 does not remain available on the secondary non-LSA DASD 22.

Following are some alternative implementations for the preferred embodiments.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Preferred embodiments were described with respect to the IBM XRC computing environment. However, the preferred logic for maintaining consistency could be applied to maintain consistency in other environments. Thus, in alternative embodiments, the data being for which consistency is maintained may include data other than data to be moved between different sites or storage areas for back-up purposes. Further, preferred embodiments may apply to environments other than the IBM XRC environment, such as a peer-to-peer back-up system, e.g., IBM PPRC.

In the described implementations, the primary and secondary control units were located external to the primary and secondary DASDs they managed. In alternative implementations, the primary and secondary control units may be embedded in the primary and secondary DASDs, respectively, to perform the primary and secondary control unit functions described herein.

Preferred embodiments were described with respect to commands used in the IBM S/390 system and the IBM 3990 Storage Controller, such as the DISCARD and erase operations. However, those skilled in the art will appreciate that the preferred embodiments could apply to commands implemented in different communication protocols using different commands, such as the Small Computer System Interface (SCSI), Fibre Channel, etc.

In preferred embodiments, the LSA system is implemented through the use of a VTOC that provides a mapping of data sets to addresses, which in the LSA system are virtual addresses and in non-LSA systems are physical storage locations. In implementations in alternative operating system environments, file allocation techniques other than the VTOC may be used, such as a File Allocation Table (FAT), etc. In preferred embodiments, the primary DASD comprises an LSA device where updates are written to free storage locations. In alternative embodiments, the primary DASD may utilize a virtual addressing technique other than an LSA type of virtual addressing technique. Still further, in preferred embodiments internal track mapping tables (ITMT) are used to indicate whether particular physical storage location are free or in-use. In alternative embodiments, different data structures may be used to indicate which physical storage locations are free.

In preferred embodiments, the primary and secondary storage devices comprise DASDs. In alternative embodiments, the primary and secondary storage devices may comprise any non-volatile storage device known in the art, or volatile memory device.

The preferred logic of FIGS. 3 and 4 is described as being implemented in software or other logic executed by the system data mover (SDM) 30. This logic may be part of the operating system of a host systems or an application program such as the IBM DFSMS storage management software. In yet further embodiments, this logic may be maintained in storage areas managed by the control units or in a read only memory or other hardwired type of device. The preferred logic may be implemented in hard disk drives or in programmable and non-programmable gate array logic.

The logic implemented in FIGS. 3 and 4 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments. For instance, in alternative command sequences, the command to update the secondary VTOC 34 may be transferred after the DISCARD command submitted at block 162.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for releasing storage space in first and second storage devices, wherein updates to the first storage are copied to the second storage device to provide secondary storage for the updates, wherein first and second tables map data sets to addresses in the first and second storage devices, respectively, comprising:

detecting a first command to invalidate data sets in the first table, wherein the addresses in the first table comprise virtual addresses, and wherein a third table provides a mapping of the virtual addresses to physical storage locations in the first storage device;

generating a second command to update the second table to invalidate the data sets in the second storage device invalidated in the first table by the first command;

detecting a third command to invalidate the virtual addresses in the third table used by the data sets invalidated in the first table to free the physical storage locations in the first storage device pointed to by the invalidated virtual addresses; and generating a fourth command directed to the physical storage locations in the second storage device used by the invalidated data sets.

2. The method of claim 1, wherein the addresses in the second table comprise virtual addresses, and wherein a fourth table provides a mapping of the virtual addresses to physical storage locations in the second storage device, wherein the fourth command updates the fourth table by invalidating the virtual addresses in the fourth table used by the data sets invalidated in the second table by the second command to free the physical storage locations in the second storage device pointed to by the invalidated virtual addresses.

3. The method of claim 1, wherein updates to data sets at virtual addresses in the first and second storage devices are written to free physical storage locations and the third and fourth tables are updated to have the virtual addresses map to the free storage locations used for the updates.

4. The method of claim 1, wherein the second command is applied to the second storage device in a sequence in which the first command was performed with respect to the first storage device.

5. The method of claim 4, wherein the fourth command is applied to the second storage device in a sequence in which the third command was performed with respect to the first storage device.

6. The method of claim 1, wherein the second and fourth commands are applied to the second storage device after a command updating the first storage device that immediately precedes the third command is applied to the second storage device and before a command updating the first storage device that immediately follows the third command is applied to the second storage device.

7. The method of claim 1, wherein the third command is generated periodically as part of a space release operation.

8. The method of claim 7, wherein the space release operation performs:

scanning the first table to determine invalidated data sets corresponding to virtual addresses, wherein the second command is generated to update the second table to invalidate the virtual addresses corresponding to the determined invalidated data sets.

9. The method of claim 1, wherein the second table maps data sets to physical storage locations in the second storage device, wherein generating the fourth command comprises generating at least one erase command to overwrite the physical storage locations in the second storage device that store the invalidated data sets.

10. The method of claim 9, wherein a flag indicates whether a secure erase function is enabled, wherein the at least one erase command to overwrite the data sets is only generated if the flag was previously set.

11. The method of claim 9, wherein the erase commands to overwrite the data sets are applied to the second storage device in the sequence in which the third command was applied to the first storage device.

12. A system for releasing storage space, comprising:

a first storage device managed by the first control unit;

a second storage device managed by the second control unit, wherein updates to the first storage device are copied to the second storage device to provide secondary storage for the updates;

a communication interface allowing communication between the first and second control unit;

a first computer readable medium including a first table mapping data sets to addresses in the first storage device and a third table mapping virtual addresses to physical storage locations in the first storage device;

a second computer readable medium including a second table mapping data sets to addresses in the second storage device;

program logic in a computer readable medium executed by a processor, wherein the program logic is capable of causing the processor to perform:

(i) detecting a first command to invalidate data sets in the first table, wherein the addresses in the first table comprise virtual addresses;

(ii) generating a second command to update the second table to invalidate the data sets in the second storage device invalidated in the first table by the first command;

(iii) detecting a third command to invalidate the virtual addresses in the third table used by the data sets invalidated in the first table to free the physical storage locations in the first storage device pointed to by the invalidated virtual addresses; and (iv) generating a fourth command directed to the physical storage locations in the second storage device used by the invalidated data sets.

13. The system of claim 12, wherein the addresses in the second table comprise virtual addresses, and wherein a fourth table provides a mapping of the virtual addresses to physical storage locations in the second storage device, wherein the fourth command updates the fourth table by invalidating the virtual addresses in the fourth table used by the data sets invalidated in the second table by the second command to free the physical storage locations in the second storage device pointed to by the invalidated virtual addresses.

14. The system of claim 12, wherein updates to data sets at virtual addresses in the first and second storage devices are written to free physical storage locations and the third and fourth tables are updated to have the virtual addresses map to the free storage locations used for the updates.

15. The system of claim 12, wherein the second command is applied to the second storage device in sequence in which the first command was performed with respect to the first storage device.

16. The system of claim 15, wherein the fourth command is applied to the second storage device in sequence in which the third command was performed with respect to the first storage device.

17. The system of claim 12, wherein the second and fourth commands are applied to the second storage device after a command updating the first storage device that immediately precedes the third command is applied to the second storage device and before a command updating the first storage device that immediately follows the third command is applied to the second storage device.

18. The system of claim 12, wherein the third command is generated periodically as part of a space release operation.

19. The system of claim 12, wherein the space release operation causes the processor to perform:

scanning the first table to determine invalidated data sets corresponding to virtual addresses, wherein the second command is generated to update the second table to invalidate the virtual addresses corresponding to the determined invalidated data sets.

20. The system of claim 12, wherein the second table maps data sets to physical storage locations in the second storage device, wherein generating the fourth command comprises generating at least one erase command to overwrite the physical storage locations in the second storage device that store the invalidated data sets.

21. The system of claim 20, wherein a flag indicates whether a secure erase function is enabled, wherein the at least one erase command to overwrite the data sets is only generated if the flag was previously set.

22. The system of claim 20, wherein the erase commands to overwrite the data sets are applied to the second storage device in the sequence in which the third command was applied to the first storage device.

23. The system of claim 12, further comprising:

a first control unit controlling access to the first storage device;

a second control unit controlling access to the second storage device; and a data mover system in communication with the first and second control unit, wherein the program logic and the processor executing the program logic are included in the data mover system.

24. An article of manufacture for releasing storage space in first and second storage devices, wherein updates to the first storage are copied to the second storage device to provide secondary storage for the updates, wherein first and second tables map data sets to addresses in the first and second storage devices, respectively, and wherein the article of manufacture includes code capable of causing a processor to perform:

detecting a first command to invalidate data sets in the first table, wherein the addresses in the first table comprise virtual addresses, and wherein a third table provides a mapping of the virtual addresses to physical storage locations in the first storage device;

generating a second command to update the second table to invalidate the data sets in the second storage device invalidated in the first table by the first command;

detecting a third command to invalidate the virtual addresses in the third table used by the data sets invalidated in the first table to free the physical storage locations in the first storage device pointed to by the invalidated virtual addresses; and generating a fourth command directed to the physical storage locations in the second storage device used by the invalidated data sets.

25. The article of manufacture of claim 24, wherein the addresses in the second table comprise virtual addresses, and wherein a fourth table provides a mapping of the virtual addresses to physical storage locations in the second storage device, wherein the fourth command updates the fourth table by invalidating the virtual addresses in the fourth table used by the data sets invalidated in the second table by the second command to free the physical storage locations in the second storage device pointed to by the invalidated virtual addresses.

26. The article of manufacture of claim 24, wherein updates to data sets at virtual addresses in the first and second storage devices are written to free physical storage locations and the third and fourth tables are updated to have the virtual addresses map to the free storage locations used for the updates.

27. The article of manufacture of claim 24, wherein the second command is applied to the second storage device in sequence in which the first command was performed with respect to the first storage device.

28. The article of manufacture of claim 27, wherein the fourth command is applied to the second storage device in sequence in which the third command was performed with respect to the first storage device.

29. The article of manufacture of claim 24, wherein the second and fourth commands are applied to the second storage device after a command updating the first storage device that immediately precedes the third command is applied to the second storage device and before a command updating the first storage device that immediately follows the third command is applied to the second storage device.

30. The article of manufacture of claim 24, wherein the third command is generated periodically as part of a space release operation.

31. The article of manufacture of claim 30, wherein code includes a space release operation capable of causing the processor to perform:

scanning the first table to determine invalidated data sets corresponding to virtual addresses, wherein the second command is generated to update the second table to invalidate the virtual addresses corresponding to the determined invalidated data sets.

32. The article of manufacture of claim 24, wherein the second table maps data sets to physical storage locations in the second storage device, wherein generating the fourth command comprises generating at least one erase command to overwrite the physical storage locations in the second storage device that store the invalidated data sets.

33. The article of manufacture of claim 32, wherein a flag indicates whether a secure erase function is enabled, wherein the at least one erase command to overwrite the data sets is only generated if the flag was previously set.

34. The article of manufacture of claim 32, wherein the erase commands to overwrite the data sets are applied to the second storage device in the sequence in which the third command was applied to the first storage device.

* * * * *

UNITED STATES PATENT AND TRADEMARK OFFICE
CERTIFICATE OF CORRECTION

PATENT NO. : 6,587,933 B2
DATED : July 1, 2003
INVENTOR(S) : Robert Nelson Crockett, William Frank Micka and David Michael Shackelford It is certified that error appears in the above-identified patent and that said Letters Patent is hereby corrected as shown below:

Column 9,
Line 3, after "first storage", insert -- device --.
Line 5, after "wherein", insert -- a --.

Column 11,
Line 42, after "first storage", insert -- device --.
Line 43, after "wherein", insert -- a --.

Signed and Sealed this

Thirteenth Day of December, 2005

JON W. DUDAS
*Director of the United States Patent and Trademark Office*